July 31, 1934.

A. P. WOOD 1,968,582

FABRICATED DYNAMO ELECTRIC MACHINE

Filed Feb. 24, 1934

Inventor:
Alexander P. Wood,
by Harry E. Dunham
His Attorney.

Patented July 31, 1934

1,968,582

UNITED STATES PATENT OFFICE 1,968,582

FABRICATED DYNAMO-ELECTRIC MACHINE

Alexander P. Wood, Schenectady, N. Y., assignor to General Electric Company, a corporation of New York Application February 24, 1934, Serial No. 712,744

7 Claims. (Cl. 171—252)

My invention relates to a fabricated construction for the stationary member of dynamo-electric machines.

An object of my invention is to provide a dynamo-electric machine construction in which a clamping member arranged at one side of the laminations and projecting through the frame is used to secure the laminations within the frame and also to provide a foot for supporting the machine.

Further objects and advantages of my invention will become apparent as the following description proceeds, and the features of novelty which characterize my invention will be pointed out with particularity in the claims annexed to and forming a part of this specification.

Figure 1:
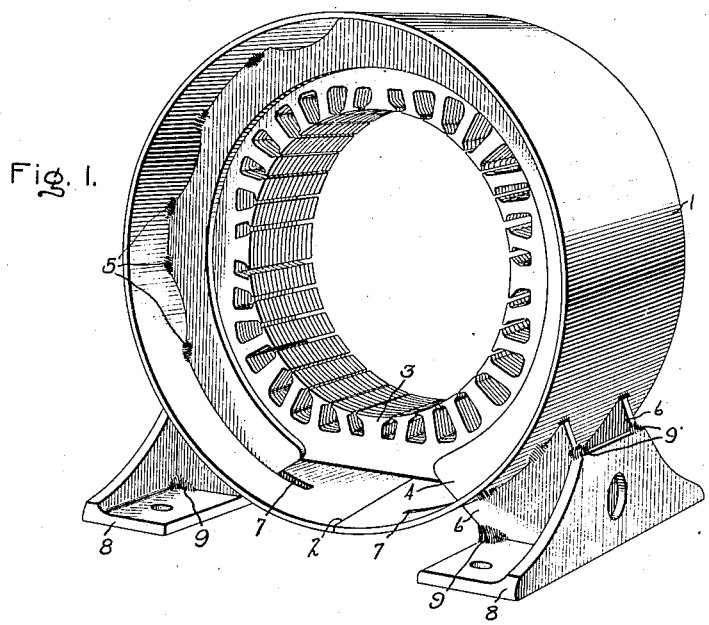
Figure 2:
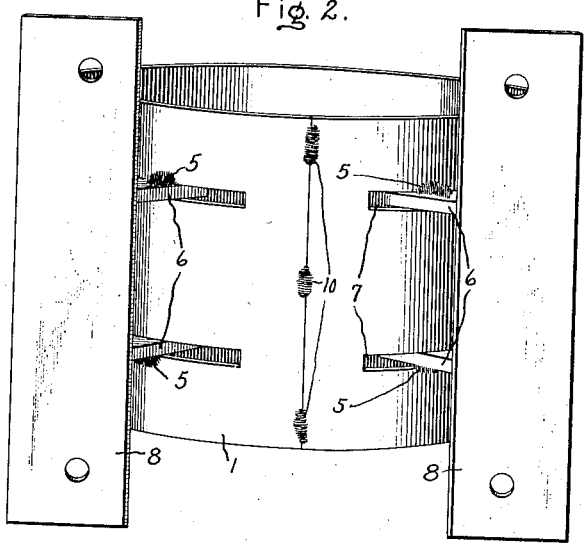

For a better understanding of my invention, reference may be had to the accompanying drawing in which Fig. 1 is a perspective view of a stationary member of a dynamo-electric machine embodying my invention; Fig. 2 is a perspective view of the construction shown in Fig. 1 tilted on its side and showing the base thereof; and Fig. 3 is a perspective view of a stator construction embodying a modification of my invention.

In the construction illustrated in Fig. 1, the outer casing or frame 1 for supporting the laminations is preferably made from a rectangular sheet of metal bent to a cylindrical form and having the abutting ends 2 welded together at 10. The core structure of the stationary member comprises an annulus of laminations 3, which are preferably tightly fitted in the casing 1. The laminations are retained within the casing between clamping members 4 in the form of open rings fitting within the casing 1 and arranged at either side of the laminations. Both of the clamping members 4 are welded to the casing at suitably spaced points 5 at which the clamping members 4 engage the casing. The clamping members have portions 6 which project through slots 7 in the casing 1. The projecting portions 6 of the clamping members are shaped to conform to angles 8 which provide feet for supporting the stationary member, and the angles 8 are welded at 9 to the projecting portions of the end rings.

It is preferred to assemble the construction shown in Fig. 1 by arranging the clamping members 4 at either side of the annulus of laminations 3 and securing them together by any suitable clamp. The rectangular sheet, which is to form the outer casing 1, is then wrapped around the laminations in such a manner that the portions 6 of the end rings project through the slots 7 in the sheet and the ends of the sheet meet at the butt joint 2. Slots 7 are of sufficient width to allow for variations in length of the annulus of laminations 3. The ends of the sheet are then welded together at 10 along the butt joint 2 and the clamping members 4 are welded at 5 to the outer casing 1. The stator laminations 3 are now secured between the clamping members 4 and the clamp which held the clamping members 4 and the laminations 3 together may be released. The angles 8 which provide the supporting feet for the machine are welded at 9 to the projecting portions 6 of the clamping members 4.

Figure 3:
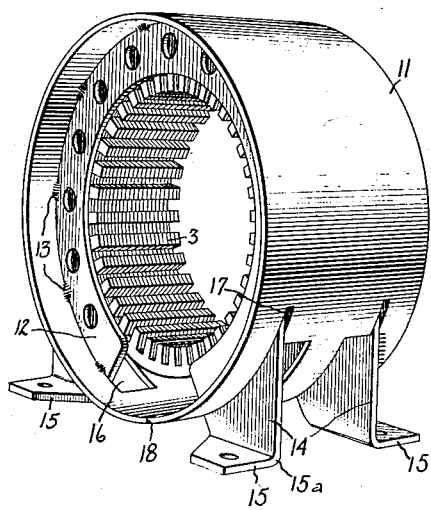

In Fig. 3, I have illustrated a modification of my invention, in which the annulus of stator laminations 3 is secured in an outer casing 11 by clamping members 12 arranged at either side of the laminations and welded at 13 to the casing. The clamping members 12 have portions 14 which project through the casing 11 and extend outwardly at 15a at right angles to form supporting feet 15 for the motor. In order to permit the clamping members 12 to be inserted in the casing 11, an enlarged opening or slot 16 is made in the outer casing 11, having a narrow portion 17 fitting the portions 14 of the clamping members.

It is preferred in assembling the construction, as shown in Fig. 3 to secure the annulus of laminations 3 together by a suitable clamp. The rectangular sheet from which the casing 11 is to be formed is wrapped around the laminations 3 in a nearly cylindrical form so that the ends of the sheet are spaced apart at butt joint 18. The clamping members 12 are then inserted in the casing 11 by first inserting the feet 15 in the opening 16 and then swinging the clamping members 12 to a position against the ends of the laminations 3. The clamping members 12 are clamped to the laminations 3, and the rectangular sheet is then wrapped tightly around the laminations closing the butt joint 18, the abutting ends of the sheet being welded together in any suitable manner. The clamping members 12 then fit in the narrow portion 17 of the opening 16. The narrow portions 17 of the openings are of sufficient width to permit some variation in the stacking length of the annulus of the laminations. The clamping members 12 are welded at 13 to the casing 11. The clamp for holding the clamping members 12 and the laminations 3 together may now be removed and the laminations 3 will be securely held within the casing 11.

Although I have shown particular embodiments of my invention, I do not desire my invention to be limited to the constructions set forth, and I intend in the appended claims to cover all modifications thereof which do not depart from the spirit and scope of my invention.

What I claim as new and desire to secure by Letters Patent of the United States is:

1. A stationary member for dynamo-electric machines comprising an outer casing, laminations arranged within said casing, a clamping member arranged at one side of said laminations and having a portion projecting through said casing, and means including said clamping member for securing said laminations within said casing and for providing a supporting foot for said stationary member.

2. A stationary member for dynamo-electric machines comprising an outer casing, laminations arranged within said casing, a clamping member arranged at one side of said laminations and having a portion shaped to provide a foot projecting through said casing, and means including said clamping member for securing said laminations within said casing.

3. A stationary member for dynamo-electric machines comprising an outer casing having a slot therein, laminations arranged within said casing, a clamping member arranged at one side of said laminations and having a portion projecting through said slot, and means including said clamping member for securing said laminations within said casing and for providing a supporting foot for said stationary member.

4. A stationary member for dynamo-electric machines comprising an outer casing having a slot therein, laminations arranged within said casing, a clamping member arranged at one side of said laminations and having a portion projecting through said slot, means including said clamping member for securing said laminations within said casing, and means including an angle secured to the projecting portion of said clamping member for providing a supporting foot for said stationary member.

5. A stationary member for dynamo-electric machines comprising an outer casing having a slot therein, laminations arranged within said casing, a clamping member arranged at one side of said laminations and having a portion shaped to provide a foot projecting through said slot, and means including said clamping member for securing said laminations within said casing.

6. A stationary member for dynamo-electric machines comprising an outer casing consisting of a bent sheet of metal having abutting ends welded together and having a slot therein, laminations arranged within said casing, a clamping member arranged at one side of said laminations and having a portion projecting through said slot, and means including said clamping member for securing said laminations within said casing and for providing a supporting foot for said stationary member.

7. A stationary member for dynamo-electric machines comprising an outer casing consisting of a bent sheet having abutting ends welded together and having a slot therein, laminations arranged within said casing, a clamping member arranged at one side of said laminations and having a portion shaped to provide a foot projecting through said slot, and means including said clamping member for securing said laminations within said casing.

ALEXANDER P. WOOD.